(12) United States Patent
Keanini et al.

(10) Patent No.: US 9,509,711 B1
(45) Date of Patent: Nov. 29, 2016

(54) COMPARING AN ORGANIZATION'S SECURITY DATA TO AGGREGATE SECURITY DATA

(75) Inventors: Timothy D. Keanini, Austin, TX (US); Brent R. Torre, Concord, MA (US); James A. Acquaviva, Boston, MA (US); Patrick J. McNerthney, Makawao, HI (US); Robert W. Thomas, Alpharetta, GA (US)

(73) Assignee: Tripwire, Inc., Portland, OR (US)

( * ) Notice: Subject to any disclaimer, the term of this patent is extended or adjusted under 35 U.S.C. 154(b) by 0 days.

(21) Appl. No.: 13/363,857

(22) Filed: Feb. 1, 2012

(51) Int. Cl.
*H04L 29/06* (2006.01)
*G06F 21/62* (2013.01)

(52) U.S. Cl.
CPC ....... *H04L 63/1433* (2013.01); *G06F 21/6254* (2013.01)

(58) Field of Classification Search
CPC ........... H04L 63/0263; H04L 63/0218; H04L 63/1433; H04L 63/0407; G06F 21/6254
See application file for complete search history.

(56) References Cited

U.S. PATENT DOCUMENTS

| 8,353,021 B1 * | 1/2013 | Satish ................. H04L 63/0263 709/202 |
| 2008/0133531 A1 * | 6/2008 | Baskerville et al. ............. 707/9 |

OTHER PUBLICATIONS

Ouedraogo, M. et al., "Security Assurance Metrics and Aggregation Techniques for IT Systems," *2009 Fourth International Conference on Internet Monitoring and Protection*, 2009, pp. 98-102.
Pham, N. et al., "Security Assurance Aggregation for IT Infrastructures," *Second International Conference on Systems and Networks Communications*, 2007, eight pages.

* cited by examiner

*Primary Examiner* — Saleh Najjar
*Assistant Examiner* — Devin Almeida
(74) *Attorney, Agent, or Firm* — Klarquist Sparkman, LLP (57) ABSTRACT

An organization's security data is compared to an aggregation of multiple organizations' security data. Security data is received from multiple organizations having organizational characteristics. The received security data is aggregated based on the organizational characteristics to generate sets of aggregate data associated with the organizational characteristics. A query is received from an organization of the multiple organizations. The query specifies a particular organizational characteristic. A set of aggregate data associated with the specified organizational characteristic is identified. A representation of the organization's security data in relation to the identified set of aggregate data is generated. The representation is transmitted to the organization in response to the query.

18 Claims, 7 Drawing Sheets

COMPARING AN ORGANIZATION'S SECURITY DATA TO AGGREGATE SECURITY DATA

BACKGROUND

1. Technical Field

The invention generally relates to the field of security/compliance and in particular to comparing one organization's security/compliance data to an aggregation of multiple organizations' security/compliance data.

2. Background Information

Today's information technology (IT) departments are inundated with data about their security and compliance, but too often they don't have the tools to assess the effectiveness and impact of their security investments, to monitor risk and compliance initiatives, or to communicate with stakeholders in a relevant and actionable context. Organizations have spent millions on protecting their data and their customers' data but are still unable to prove that security is improving and compliance is achieved.

It would be helpful if an organization could obtain a real-world understanding of how its security and compliance posture compares to other similar organizations. However, no system exists for aggregating multiple organizations' security/compliance data and comparing that data to one organization's security/compliance data.

SUMMARY

The above and other issues are addressed by a computer-implemented method, non-transitory computer-readable storage medium, and computer system for comparing an organization's security data to an aggregation of multiple organizations' security data. An embodiment of the method comprises receiving security data from multiple organizations having organizational characteristics. The method further comprises aggregating the received security data based on the organizational characteristics to generate sets of aggregate data associated with the organizational characteristics and receiving a query from an organization of the multiple organizations. The query specifies a particular organizational characteristic. The method further comprises identifying a set of aggregate data associated with the specified organizational characteristic; generating a representation of the organization's security data in relation to the identified set of aggregate data; and transmitting the representation to the organization in response to the query.

An embodiment of the medium stores executable computer program instructions for comparing an organization's security data to an aggregation of multiple organizations' security data. The instructions receive security data from multiple organizations having organizational characteristics. The instructions further aggregate the received security data based on the organizational characteristics to generate sets of aggregate data associated with the organizational characteristics and receive a query from an organization of the multiple organizations. The query specifies a particular organizational characteristic. The instructions further identify a set of aggregate data associated with the specified organizational characteristic; generate a representation of the organization's security data in relation to the identified set of aggregate data; and transmit the representation to the organization in response to the query.

An embodiment of the computer system for comparing an organization's security data to an aggregation of multiple organizations' security data comprises at least one non-transitory computer-readable storage medium storing executable computer program instructions. The instructions comprise instructions for receiving security data from multiple organizations having organizational characteristics. The instructions further aggregate the received security data based on the organizational characteristics to generate sets of aggregate data associated with the organizational characteristics and receive a query from an organization of the multiple organizations. The query specifies a particular organizational characteristic. The instructions further identify a set of aggregate data associated with the specified organizational characteristic; generate a representation of the organization's security data in relation to the identified set of aggregate data; and transmit the representation to the organization in response to the query.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
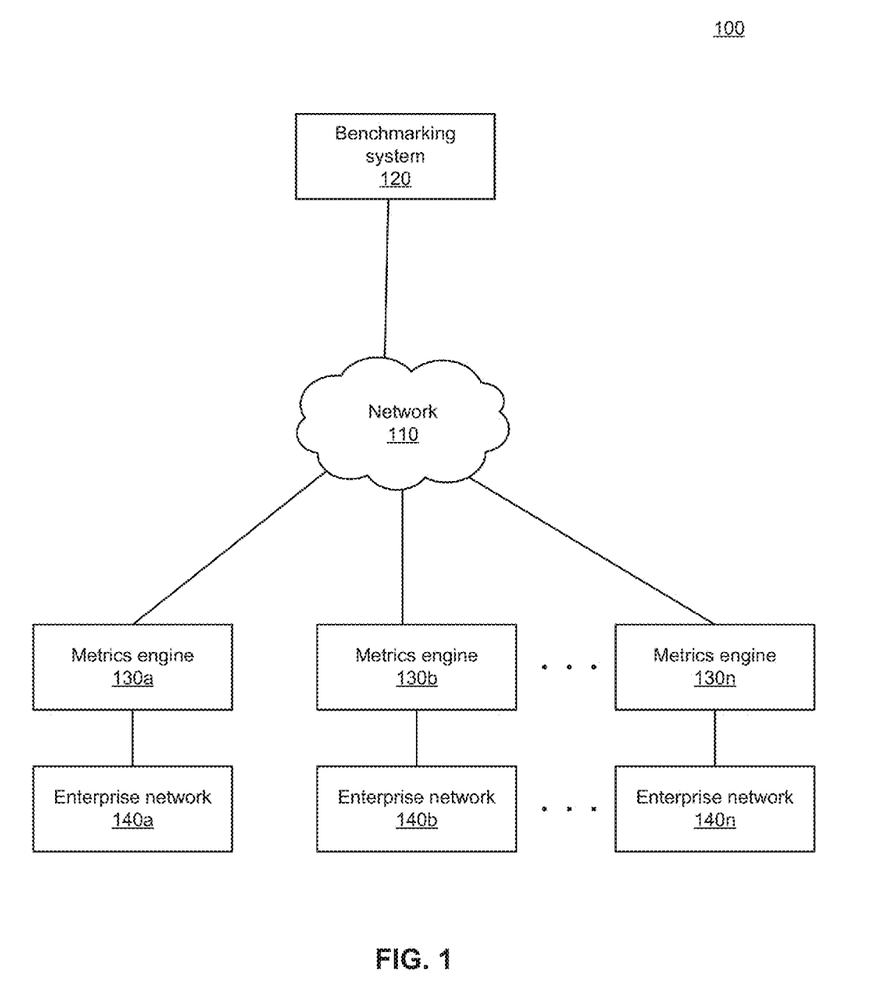
FIG. 1 is a high-level block diagram illustrating an environment for comparing one organization's security/compliance data to an aggregation of multiple organizations' security/compliance data according to one embodiment.

FIG. 1 is a high-level block diagram illustrating an environment 100 for comparing one organization's security/compliance data (collectively, "security data") to an aggregation of multiple organizations' security data according to one embodiment. The environment 100 enables organizations to measure their performance against their own goals as well as against the performance of their industry peers. For example, the environment 100 enables organizations to compare their security and compliance programs against industry benchmarks that are continuously updated by similar organizations.

As shown, the environment 100 includes a network 110, a benchmarking system 120, multiple metrics engines 130 (130a, 130b, . . . , 130n), and multiple enterprise networks 140 (140a, 140b, . . . , 140n). While only one benchmarking system 120 is shown in the embodiment depicted in FIG. 1 for clarity, other embodiments can have multiple benchmarking systems 120. Also, while only three metrics engines 130 and three enterprise networks 140 are shown in the embodiment depicted in FIG. 1 for clarity, other embodiments can have other numbers of metrics engines 130 and enterprise networks 140.

The network 110 represents the communication pathway between the benchmarking system 120 and the metrics engines 130. In one embodiment, the network 110 uses standard communications technologies and/or protocols and can include the Internet. Thus, the network 110 can include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 110 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), etc. The data exchanged over the network 110 can be represented using technologies and/or formats including image data in binary form (e.g. Portable Network Graphics (PNG)), hypertext markup language (HTML), extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities on the network 110 can use custom and/or dedicated data communications technologies instead of, or in addition to, the ones described above.

An enterprise network 140 is an enterprise-level network associated with a particular organization. The organization can be, for example, a corporation, a university, or a government agency. The enterprise network 140 includes various devices that are communicatively connected. Some of the devices are used to accomplish the organization's goals, such as client devices (e.g., desktop computers, laptop computers, and mobile devices) and servers (e.g., email servers and data servers). Some of the devices are security and/or compliance systems that address issues such as vulnerability management, patch management, configuration auditing, identity and access management, anti-virus and endpoint protection, endpoint encryption, event management and incident response, and network protection.

A metrics engine 130 gathers data from the devices within an enterprise network 140 and calculates various metrics based on the gathered data. A particular metrics engine 130 gathers data from a particular enterprise network 140. For example, metrics engine 130a gathers data from enterprise network 140a. The metrics engine 130 gathers data from a device using a data adapter, calculates metrics using metrics routines, and stores the resulting metrics data in a local repository. Data adapters, metrics routines, and metrics data are described below with reference to data adapter repository 320, metrics routines repository 330, and client metrics 340 respectively.

The metrics engine 130 also communicates with the benchmarking system 120 using the network 110. Specifically, the metrics engine 130 sends metrics data to the benchmarking system 120. The metrics engine 130 also sends queries to the benchmarking system 120, receives responses from the benchmarking system 120, and displays the responses. The queries concern comparing one organization's security data to an aggregation of multiple organizations' security data. The responses are displayed as visual "scorecards" designed for a variety of audiences, enabling organizations to measure and track their security and compliance posture over time and with respect to other organizations like theirs, giving insight into how the organization is doing compared to others.

The metrics engine 130 is a computer (or set of computers) that stores one or more processing modules and/or one or more data repositories. In one embodiment, the metrics engine 130 is maintained by the organization that maintains the enterprise network 140 from which the metrics engine gathers data. The metrics engine 130 is keyed to the organization (specifically, to an account associated with the organization, described below with reference to account management module 460). The metrics engine 130 is further described below with reference to FIGS. 3 and 5-6.

A benchmarking system 120 helps a metrics engine 130 gather data and generate metrics by sending the metrics engine one or more data adapters and/or metrics routines. The benchmarking system 120 also receives metrics data from multiple metrics engines 130. Each metrics engine 130 that sends data to the benchmarking system 120 is associated with a different organization. The benchmarking system 120 aggregates the received metrics data according to organizational demographic data so that the aggregate data represents multiple organizations' metrics data. The benchmarking system 120 also responds to queries from metrics engines 130 regarding comparing one organization's security data to an aggregation of multiple organizations' security data. In one embodiment, the benchmarking system 120 maintains separate accounts for different organizations and enables an organization to manage its own account.

The benchmarking system 120 is a computer (or set of computers) that stores one or more processing modules and/or one or more data repositories. In one embodiment, the benchmarking system 120 is maintained by one or more enterprises that facilitate analysis of security data, such as corporations, universities, or government agencies. The benchmarking system 120 is further described below with reference to FIGS. 4-6.

Figure 2:
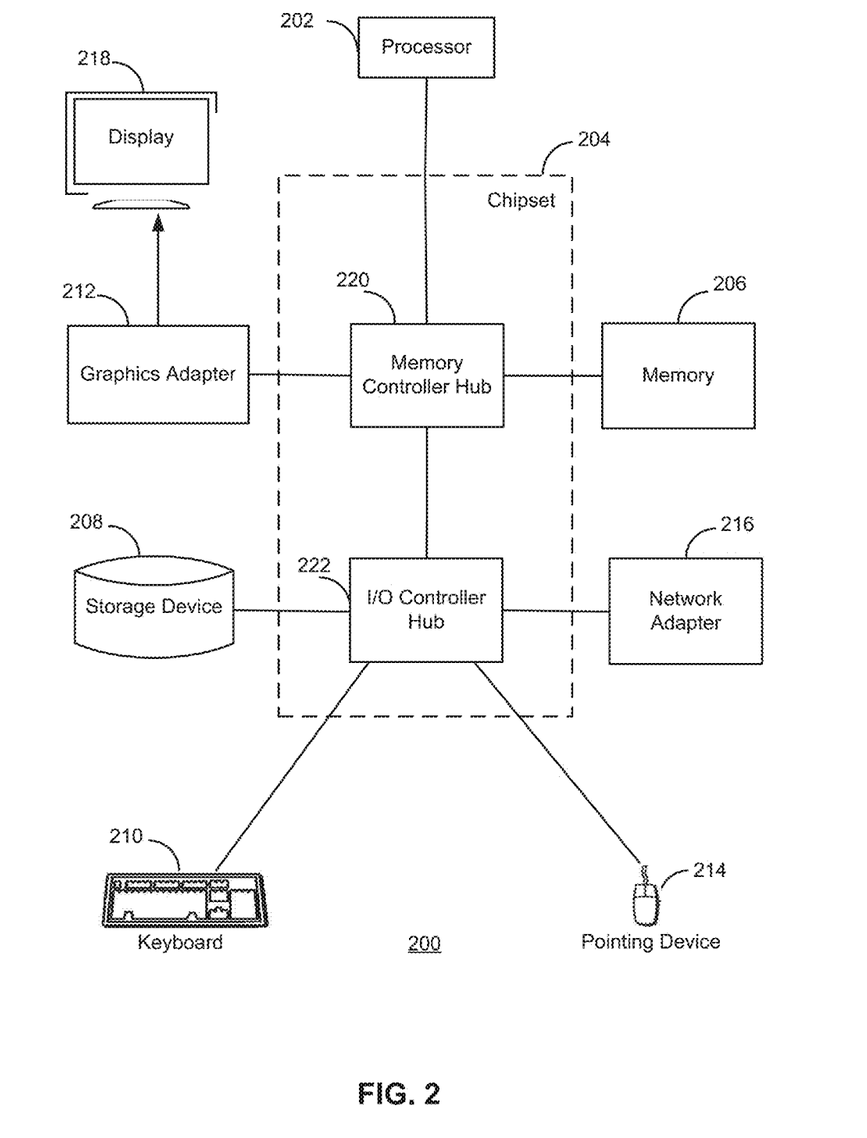
FIG. 2 is a high-level block diagram illustrating an example of a computer for use as one or more of the entities illustrated in FIG. 1, according to one embodiment.

FIG. 2 is a high-level block diagram illustrating an example of a computer 200 for use as one or more of the entities illustrated in FIG. 1 in accordance with one embodiment. Illustrated are at least one processor 202 coupled to a chipset 204. The chipset 204 includes a memory controller hub 250 and an input/output (I/O) controller hub 255. A memory 206 and a graphics adapter 213 are coupled to the memory controller hub 250, and a display device 218 is coupled to the graphics adapter 213. A storage device 208, keyboard 210, pointing device 214, and network adapter 216 are coupled to the I/O controller hub 255. Other embodiments of the computer 200 have different architectures. For example, the memory 206 is directly coupled to the processor 202 in some embodiments.

The storage device 208 includes one or more non-transitory computer-readable storage media such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 213 displays images and other information on the display device 218. In some embodiments, the display device 218 includes a touch screen capability for receiving user input and selections. The network adapter 216 couples the computer system 200 to the network 110. Some embodiments of the computer 200 have different and/or other components than those shown in FIG. 2. For example, a repository and/or a processing server can be formed of multiple blade servers and lack a display device, keyboard, and other components.

The computer 200 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Figure 3:
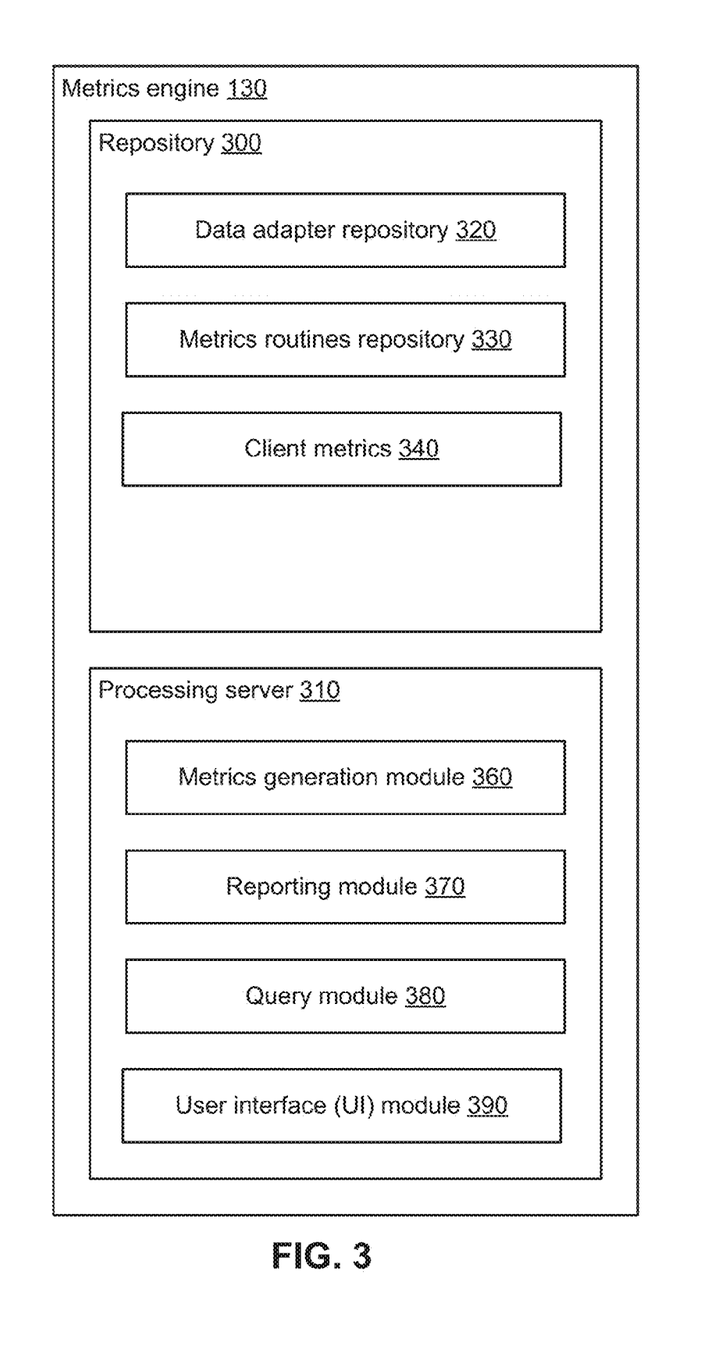
FIG. 3 is a high-level block diagram illustrating a detailed view of a metrics engine, according to one embodiment.

FIG. 3 is a high-level block diagram illustrating a detailed view of a metrics engine 130, according to one embodiment. The metrics engine 130 includes a repository 300 and a processing server 310. The repository 300 is a computer (or set of computers) that stores a data adapter repository 320, a metrics routines repository 330, and client metrics 340. In one embodiment, the repository 300 includes a server that provides the processing server 310 access to the data adapter repository 320, the metrics routines repository 330, and the client metrics 340 in response to requests.

The data adapter repository 320 stores one or more data adapters. A data adapter connects the metrics engine 130 to raw data generated by a device within an enterprise network 140 (e.g., a security/compliance system such as an anti-virus program, a firewall, or a network intrusion system). Specifically, the data adapter connects to the device, extracts specific security/compliance content from the device's data store, and delivers the data to the metrics engine 130 as a normalized data set. Since different devices store data in different ways, a particular data adapter is specific to a particular device. A device might require credentials in order to access the device's data. In this situation, the relevant data adapter is configured with appropriate credentials (e.g., a username and password). By configuring the data adapter in this way, the data obtained by the data adapter is given an auditable identity. Specifically, a fully-verifiable audit trail of what has been read from the device is generated.

The metrics routines repository 330 stores one or more metrics routines. A metrics routine includes logic that instructs a metrics engine 130 regarding how to calculate one or more metrics using data sent from a data adapter to the metrics engine 130. In one embodiment, metrics are designed with reference to a plurality of data sources (e.g., devices within an enterprise network 140) and subsequently deployed as a "Metrics Definition Package" (MDP). An MDP provides metrics or a comprehensive overview of deployed resources in terms of, for example, performance, effectiveness, costs, and trends. An MDP includes various business logic in terms of schema or meta-data and/or logic between any two of the data sources or among any of the data sources with or without other supplemental data or logic. Depending on implementation, the MDP may also include formulas or logic representations to facilitate various computations and/or manipulations of the data sources with or without other supplemental data or logic. As used herein, the business logic is defined as various operations among various distributed resources in terms of schema or meta-data. Examples of the business logic include arithmetic, analytic and logic operations among the data sources. Further examples may also include actionable notations and remediable actions along a workflow. According to one application, the business logic is designed to notify a responsible person by email when a virus is detected on a specific local area network. According to another application, the business logic is designed to report effectiveness in terms of traffic or usage versus costs after an extra network server is deployed, and the business logic is also designed to report a trend of when or how another extra network server may be deployed.

Examples of business logic may include, but not be limited to, various manipulations of the data sources such as calculating mean, standard deviation or Z-score, applying models for forecasting, correlating or anomaly detecting, aggregating details into higher level summaries, and applying policies to assign status values (e.g., red, yellow, green) or key performance indicators or grades (e.g., A, B, C, etc.). In one embodiment, particular logic may require joining data from two different data sources together with a reference key. In another embodiment, some data sets are derived or computed from one or more data sources. In still another embodiment, data either from one or more of the data sources or supplied from a user or a device are produced pending some conditions or computations. The logic is encapsulated in an MDP.

In one embodiment, metrics are defined in terms of the schema or meta-data of the data sets needed to drive them. This specification has no dependency upon specific external systems that may be used to populate the data sets when the resultant MDP is executed. Metrics are bound to a customer unique set of authoritative data sources when the MDP is deployed. This enables metrics logic in the MDP to be equally applicable to any other customer environments that can identify substantially similar authoritative data sources for each required input data set.

In one embodiment, an MDP is in XML (eXtensible Markup Language) format. However, an MDP can be in other forms, such as binary form. A metrics engine 130 can be implemented as an interpreter that executes the MDP.

Client metrics 340 includes metrics data specific to a particular organization. For example, the metrics data may be calculated based on data that was gathered from devices located within that organization's enterprise network 140. In one embodiment, the level of detail of the client metrics 340 is configurable (e.g., by a user associated with the organization). For example, the configuration can specify that metrics results contain no "organization-identifiable information." This means that metrics routines do not generate results with sensitive data, such as IP addresses and host names. Alternatively, the configuration can specify that metrics results can contain sensitive data. The added richness provided by this detail data enables scorecards such as "Top Infected Hosts" or enhances coverage scorecards by matching IP addresses or hosts managed to assets under management.

The processing server 310 includes various modules such as a metrics generation module 360 for gathering data and calculating metrics based on the gathered data, a reporting module 370 for sending metrics data to the benchmarking system 120, a query module 380 for sending queries to and receiving responses from the benchmarking system, and a user interface (UI) module 390 for displaying information to and receiving information from a user. In one embodiment, the processing server 310 includes a computer (or set of computers) that communicates with the repository 300 and processes data (e.g., by executing the metrics generation module 360, the reporting module 370, the query module 380, and the UI module 390).

The metrics generation module 360 gathers data and calculates metrics based on the gathered data. For example, the metrics generation module 360 executes one or more data adapters to gather data from one or more devices within an enterprise network 140. The metrics generation module 360 then uses the data gathered by the data adapters to fulfill fields in one or more required data sets. The metrics generation module 360 then executes one or more metrics routines to calculate desired metrics results based on the data sets. Finally, the metrics generation module 360 stores the resulting metrics data as client metrics 340 and discards the detailed data in the data sets.

Note that security data is saved at the summary level. For example, rather than saving all vulnerabilities and risk scores and assets, the metrics generation module 360 collects the detailed information, calculates the desired metrics, and then discards the detailed information. In one embodiment, the execution schedule of the metrics generation module 360 is configurable (e.g., by a user associated with the organization). The execution schedule can be, for example, once every 12 hours or once every two days.

The reporting module 370 sends metrics data to the benchmarking system 120. Specifically, the reporting module 370 sends client metrics 340 to the benchmarking system 120. In one embodiment, the client metrics 340 are sent in encrypted format. Note that while metrics data is sent to the benchmarking system 120, detailed security information is not. (The detailed security information was discarded by the metrics generation module 360.) The transmission of metrics data, without detailed security information, enhances both data security and system performance.

Recall that a particular metrics engine 130 is keyed to a particular organization's account. The benchmarking system 120 validates this key upon transfer of the metrics data (by the reporting module 370) to the benchmarking system 120. The benchmarking system 120 authenticates the metrics data to the associated account. This authentication ensures that only approved, organization-specific metrics engines 130 can upload data to their associated accounts. In one embodiment, the metrics data transfer schedule of the reporting module 370 is configurable (e.g., by a user associated with the organization). The transfer schedule can be, for example, once every 12 hours or once every two days.

The query module 380 sends queries to and receives responses from the benchmarking system 120. The queries concern comparing one organization's security data to an aggregation of multiple organizations' security data. The multiple organizations form a "community." The community is a set of multiple organizations whose security data is aggregated and then compared against the one organization's security data. A community is defined by one or more characteristics that are shared across all of the organizations within the community. An organizational characteristic includes an attribute and one or more values (or a range of values) for that attribute.

In one embodiment, an attribute is demographic information such as an industry within which an organization operates, a size of an organization, a number of assets under management by an organization, or a geographic region within which an organization operates. Possible values for the industry attribute include Accounting, Advertising/Marketing/Public Relations, Aerospace and Defense, etc. Possible values for the organization size attribute include 1-25 employees, 26-50 employees, 51-100 employees, etc. Possible values for the number of assets attribute include 1-100, 101-500, 501-1000, etc. Possible values for the geographic region attribute are countries, states, local business regions (e.g., the San Francisco Bay Area in California), etc.

Other possible attributes include, for example, compliance with regulations, implementation of best practices, membership in consortia, and money spent on security. Possible values for the regulation attribute include, for example, Payment Card Industry Data Security Standards (PCI), Sarbanes-Oxley Act of 2002 (SOX), Federal Information Security Management Act of 2002 (FISMA), and Gramm-Leach-Bliley Act (GLBA). Possible values for the best practices attribute include, for example, COBIT (an IT governance framework and supporting toolset), Committee of Sponsoring Organizations of the Treadway Commission (COSO), and International Organization for Standardization (ISO). Possible values for the consortia attribute include, for example, Certification and Information Security Services (CIS) and Computer Emergency Response Team (CERT). Possible values for the money spent attribute include, for example, a percentage (e.g., the percentage of income spent on security) or a sum of money.

A query includes parameters that define a community against which an organization wants to compare itself. The parameters include one or more organizational characteristics, as described above. One type of query defines a community based on a single characteristic. Queries of this type include, for example, "Accounting organizations" (here, the attribute is "industry" and the value is "Accounting") or "Very Small organizations" (here, the attribute is "organization size" and the value is "1-25 employees"). Another type of query defines a community based on a combination of multiple characteristics. Queries of this type include, for example, "Very Large Financial Services organizations" (here, the attributes are "industry" and "organization size" and the values are "Financial Services" and "50,000+ employees," respectively). Characteristic combinations include, for example, a) industry and organization size, b) industry and assets under management, and c) organization size and assets under management.

Figure 4:
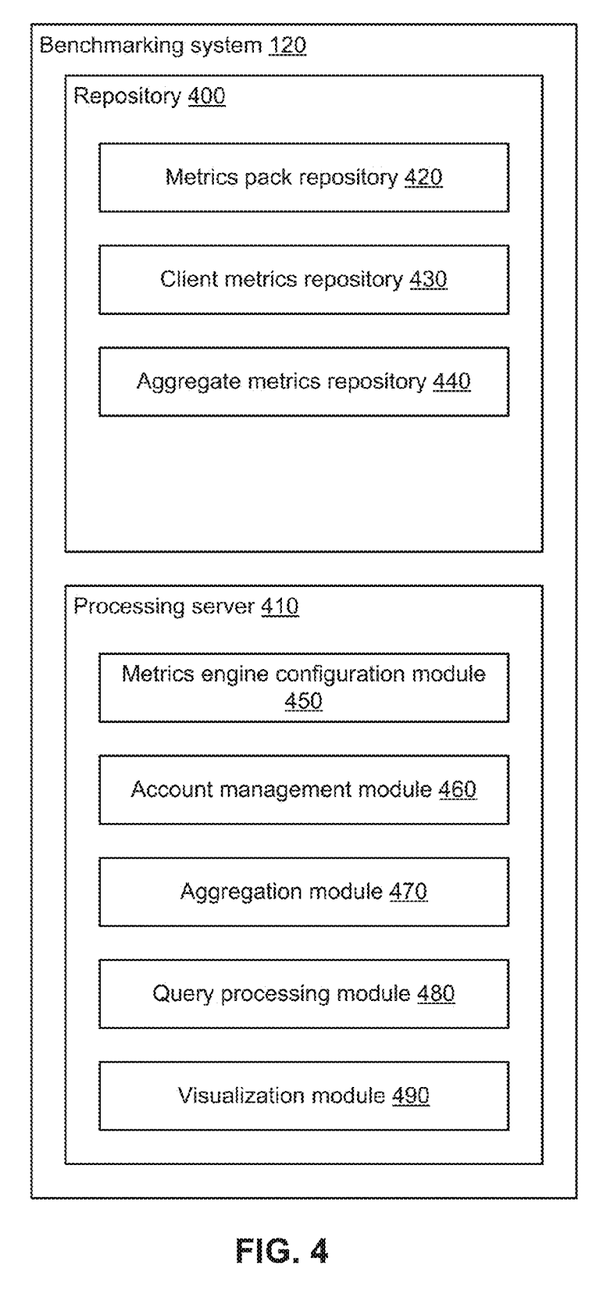
FIG. 4 is a high-level block diagram illustrating a detailed view of a benchmarking system, according to one embodiment.

In one embodiment, a query also includes staleness preferences. As further described below, the aggregate metrics repository 440 stores a separate set of aggregate metrics data for each possible query (as defined by the one or more organizational characteristics specified as query parameters). The aggregate metrics associated with the community defined by a particular query may or may not already exist in the aggregate metrics repository 440. If the aggregate metrics do exist, then the aggregate metrics can be used to answer the query. The staleness preferences, if present, specify how current the aggregate metrics must be in order for them to be used to answer the query. For example, the staleness preferences can state that the aggregate metrics should always be recalculated so that they are as current as possible when answering the query. Alternatively, the staleness preferences can provide a timestamp (or time period). If the aggregate metrics were calculated prior to the timestamp (or calculated longer ago than the time period), then the aggregate metrics are considered to be stale and should be recalculated.

In one embodiment, a query also includes metrics data. The metrics data is specific to a particular organization (e.g., client metrics 340), specifically, the organization whose metrics engine 130 is submitting the query to the benchmarking system 120. In another embodiment, a query does not include metrics data. In that embodiment, the benchmarking system 120 obtains metrics data from the client metrics repository 430 that corresponds to the organization whose metrics engine 130 is submitting the query to the benchmarking system 120. The metrics data (whether contained in the query or obtained from the client metrics repository) is used by the benchmarking system 120 to generate a client scorecard (discussed below).

The user interface (UI) module 390 displays information to and receives information from a user. The UI module 390 enables a user to specify a query (e.g., by inputting various query parameters) and displays the results of the query. Query parameters were discussed above with reference to the query module 380. Query results include, for example, metric data on a single-organization level and metric data on a multiple-organization (i.e., community) level.

In one embodiment, metric data is displayed as a "scorecard." A scorecard is a visually-rich presentation of metrics results that shows, at a glance, how a particular aspect of a security infrastructure is performing. In one embodiment, metrics results are represented in what is referred to as a "Scorecard Definition Package" (SDP) that is designed for presenting the results in a dynamic and comprehensible manner. A scorecard uses visual components, data from one or more metrics results, and logic so that the executed metrics results are presented. A scorecard is designed with various data (e.g., metrics results) in conjunction with various visual components to provide an easy-to-understand and comprehensive presentation for an intended audience. The visual components may include, but not be limited to, graphs, charts, icons, widgets and the like. A scorecard converts and presents static information (e.g., metrics results) into dynamic, expandable, and browse-able representations. A scorecard can include a representation of static data in charts, graphs, pictures or data trends, or interaction or logic operation among different sets of data.

In one embodiment, an SDP includes various business logic, data definitions, data interactions, data calculations, annotations, texts, version numbers, and ways of presentation. An SDP can include hyperlinks to allow a view to incorporate additional data. Depending on implementation, an SDP can be viewed in a web browser (e.g., Microsoft Internet Explorer), viewed in Portable Document Format (PDF), or viewed in Microsoft Word or Microsoft PowerPoint. An SDP can be stored in and deployed to a computing device such that a comprehensive view of the metrics about deployed resources across an enterprise can be provided if needed.

A "client scorecard" presents metric data on a single-organization level (e.g., based on client metrics 340). A "community scorecard" presents metric data on a multiple-organization level (e.g., based on a community's aggregate metrics). In one embodiment, each type of query (as defined by the organizational attributes specified as query parameters) is associated with a different scorecard template. For example, a query based solely on the "industry" attribute would be associated with one scorecard template, while a query based on both the "industry" attribute and the "organization size" attribute would be associated with a different scorecard template.

The UI module 390 may also enable a user to add a comment to ("annotate") a scorecard. A scorecard is associated with a particular organizational account (described below) and can be either a client scorecard or a community scorecard. In order for a user to be able to annotate a particular scorecard, the user must have a user account (described below) associated with the scorecard's organizational account and have appropriate permissions. The annotation functionality enables users to exchange ideas about a scorecard. Scorecard annotations can be useful for communicating scorecard results within a workgroup and clarifying any questions so that review meetings can be focused on assessing levels of risk and making decisions based on that risk, rather than on interpreting the data. An annotation can be tracked based on an identifier ("ID") of the user submitting the comment or the user can remain anonymous. An annotation can be associated with a date used to indicate the age of the comment. Comments are visible to any user with access to the scorecard.

The UI module 390 may also enable a user to manage an organization's account. This functionality is described below with reference to the account management module 460.

FIG. 4 is a high-level block diagram illustrating a detailed view of a benchmarking system 120, according to one embodiment. The benchmarking system 120 includes a repository 400 and a processing server 410. The repository 400 is a computer (or set of computers) that stores a metrics pack repository 420, a client metrics repository 430, and an aggregate metrics repository 440. In one embodiment, the repository 400 includes a server that provides the processing server 410 access to the metrics pack repository 420, the client metrics repository 430, and the aggregate metrics repository 440 in response to requests.

The metrics pack repository 420 stores one or more "metrics packs." A metrics pack includes one or more data adapters, one or more metrics routines, and one or more scorecard templates meant to assess performance for a specific IT security or compliance discipline. Specific IT security/compliance disciplines include, for example, vulnerability management, patch management, configuration auditing, identity and access management, anti-virus and endpoint protection, endpoint encryption, event management and incident response, and network protection. The data adapters and metrics routines are sent to a metrics engine 130, where they are used to gather data and generate metrics, as described above. The scorecard templates are used by the benchmarking system 120 to generate scorecards that are then sent to a metrics engine 130, where they are displayed.

The client metrics repository 430 stores metrics data for multiple organizations. In one embodiment, the metrics data for each organization (e.g., client metrics 340) is stored separately. For example, the data is stored in multiple database instances, where each database instance stores metrics data for only one organization. With reference to FIG. 1, a first database instance would store metrics received from metrics engine 130a, a second database instance would store metrics received from metrics engine 130b, and so on. The metrics data may be stored in encrypted form.

The aggregate metrics repository 440 stores aggregate metrics data for multiple organizations. In one embodiment, the aggregate metrics repository 440 stores a separate set of aggregate metrics data for each possible query (as defined by the one or more organizational characteristics specified as query parameters). For example, a first set of aggregate metrics would be associated with an "Accounting organizations" query. This set of aggregate metrics would be based on metrics from organizations whose value of the "industry" attribute is equal to "Accounting." A second set of aggregate metrics would be associated with a "Very Large Financial Services organizations" query. This set of aggregate metrics would be based on metrics from organizations whose value of the "industry" attribute is equal to "Financial Services" and whose value of the "organization size" attribute is equal to "50,000+ employees." Aggregate metrics can be stored in a separate database instance relative to the database instances in the client metrics repository 430.

Aggregate metrics results may be accessed by a participating organization's account through a special set of system routines that present the information in scorecards, charted alongside the organization's internal results for easy comparison. Aggregate metric results are not accessible to anyone but participating organizations.

The processing server 410 includes various modules such as a metrics engine configuration module 450 for configuring a metrics engine, an account management module 460 for managing organizational accounts, an aggregation module 470 for generating aggregate metrics, a query processing module 480 for processing a query, and a visualization module 490 for generating scorecards. In one embodiment, the processing server 410 includes a computer (or set of computers) that communicates with the repository 400 and processes data (e.g., by executing the metrics engine configuration module 450, the account management module 460, the aggregation module 470, the query processing module 480, and the visualization module 490). In one embodiment, the processing server 410 includes a web server that responds to queries from the metrics engine 130.

The metrics engine configuration module 450 configures a metrics engine 130 (specifically, the metrics generation module 360) to gather data and calculate metrics based on the gathered data. For example, the metrics engine configuration module 450 accesses a metrics pack (from the metrics pack repository 420) and sends the metrics pack's data adapters and metrics routines to the metrics engine 130. The data adapters and metrics routines are installed at the metrics engine 130 (e.g., the data adapters and metrics routines are stored in the data adapter repository 320 and the metrics routines repository 330, respectively). The data adapters and metrics routines are then used by the metrics generation module 360 to gather data and generate metrics, as described above.

The account management module 460 manages organizational accounts. Recall that each metrics engine 130 is associated with a different organization. Each of these organizations has a different account, managed by the account management module 460. The account management module 460, in conjunction with the UI module 390, enables an authorized user to manage an organizational account. For example, an authorized user can manage the demographic data and user accounts associated with the organizational account.

An organizational account is associated with demographic data that describes that organization. This demographic data is used by the aggregation module 470 to generate aggregate metrics. In one embodiment, demographic data is entered manually by a user. In another embodiment, demographic data is determined automatically without user intervention. For example, a network discovery program can be executed on an enterprise network 140 to determine how many assets are present in the network.

An organizational account is also associated with one or more user accounts. Access to a user account is protected by a username and password. Each user account is assigned a role such as Participant, Viewer, Administrator, or Unassigned. The role determines which actions the user is allowed to perform. All user accounts that are associated with a particular organizational account can view the metrics and scorecards associated with that organizational account, regardless of role. An Administrator user account can send an invitation to someone to establish a user account (with a particular role) associated with that organizational account.

The invited user will receive a registration email that includes a link to set a password and activate a user account. Once activated, that user will have access to the organizational account based on the specified role.

In one embodiment, an organizational account is associated with a distinctive database instance. This database instance stores that organization's metrics, as described above with reference to client metrics repository 430.

In one embodiment, a special account is associated with the aggregate metrics (stored in aggregate metrics repository 440). This account includes no reference to the identities of the particular organizations whose metrics were used to generate the aggregate metrics. Also, no organization-specific information or attributes are stored in the account. The account enables scheduling and initiation of aggregate metrics compilation (performed by the aggregation module 470), provides secure storage and management of results (in aggregate metrics repository 440), and provides secure access to results by participating organizations.

The aggregation module 470 generates aggregate metrics, such as the metrics stored in aggregate metrics repository 440. The aggregation module 470 calculates aggregate metrics in an automated process that produces only aggregated results. The aggregated results are then stored in a separate account. From this account, it is not possible to identify the source data (i.e., metrics from individual organizations) that contributed to the aggregate results. In this way, contributions from individual organizations are secure and untraceable to any contributor.

In one embodiment, when the aggregate metric calculation process is started, a specially configured metrics engine is launched. This instance of the engine is authenticated to access participating organizations' accounts solely for the purpose of aggregating results. This authentication assures predictability and auditability of aggregate calculations. Furthermore, the authentication assures that participant results are accessed by only authenticated services. Results of the aggregation are stored in aggregate metrics repository 440. The results are an aggregation of all participating organizations' results. Only the final aggregated metric or metrics are stored. No accompanying detailed information on any of the participants is stored.

In one embodiment, the aggregation module 470 executes upon request (e.g., a request from the query processing module 480, described below). Executing the aggregation module upon request ensures that the resulting aggregate metrics are current. However, execution of the aggregation module can require a significant amount of time. The aggregation module 470 can execute without a request, according to a configurable schedule (e.g., once per week). Executing the aggregation module according to a configurable schedule generates aggregate metrics before they are needed, thereby avoiding extra processing time needed to respond to a query (e.g., a query received from a metrics engine 130). However, since the aggregate metrics were generated in the past, they might be out-of-date by the time a query is received.

The query processing module 480 processes a query. For example, the query processing module 480 takes as input a query received from a metrics engine 130. The query processing module 480 analyzes the query to determine the query parameters, including one or more organizational characteristics. The query processing module 480 then determines whether the relevant aggregate metrics already exist within aggregate metrics repository 440 (i.e., whether the relevant aggregate metrics were calculated in the past and stored in the aggregate metrics repository 440). If the relevant aggregate metrics do exist within aggregate metrics repository 440, then the query processing module 480 returns a pointer to those aggregate metrics. If the relevant aggregate metrics do not exist within aggregate metrics repository 440, then the query processing module 480 requests the aggregation module 470 to generate the relevant aggregate metrics and store them in the aggregate metrics repository 440. The query processing module 480 then returns a pointer to those aggregate metrics.

Recall that a query can include staleness preferences, which specify how current the aggregate metrics must be in order for them to be used to answer a query. The query processing module 480 determines whether the query includes staleness preferences. If the query does include staleness preferences, then the query processing module 480 determines whether the preferences require new aggregate metrics to be generated. If the preferences do require new aggregate metrics to be generated, then the query processing module 480 requests the aggregation module 470 to generate the relevant aggregate metrics and store them in the aggregate metrics repository 440. The query processing module 480 then returns a pointer to those aggregate metrics. Note that staleness preferences can cause the aggregation module 470 to generate the relevant aggregate metrics and store them in the aggregate metrics repository 440, even if the relevant aggregate metrics already exist within aggregate metrics repository 440.

The visualization module 490 generates scorecards. For example, the visualization module 490 generates client scorecards and community scorecards. A client scorecard presents metric data for a single organization (e.g., an organization whose metrics engine sent a query to the benchmarking system 120). A community scorecard presents aggregate metric data for multiple organizations (e.g., organizations specified by query parameters within a query sent from a metrics engine to the benchmarking system 120).

Figure 5:
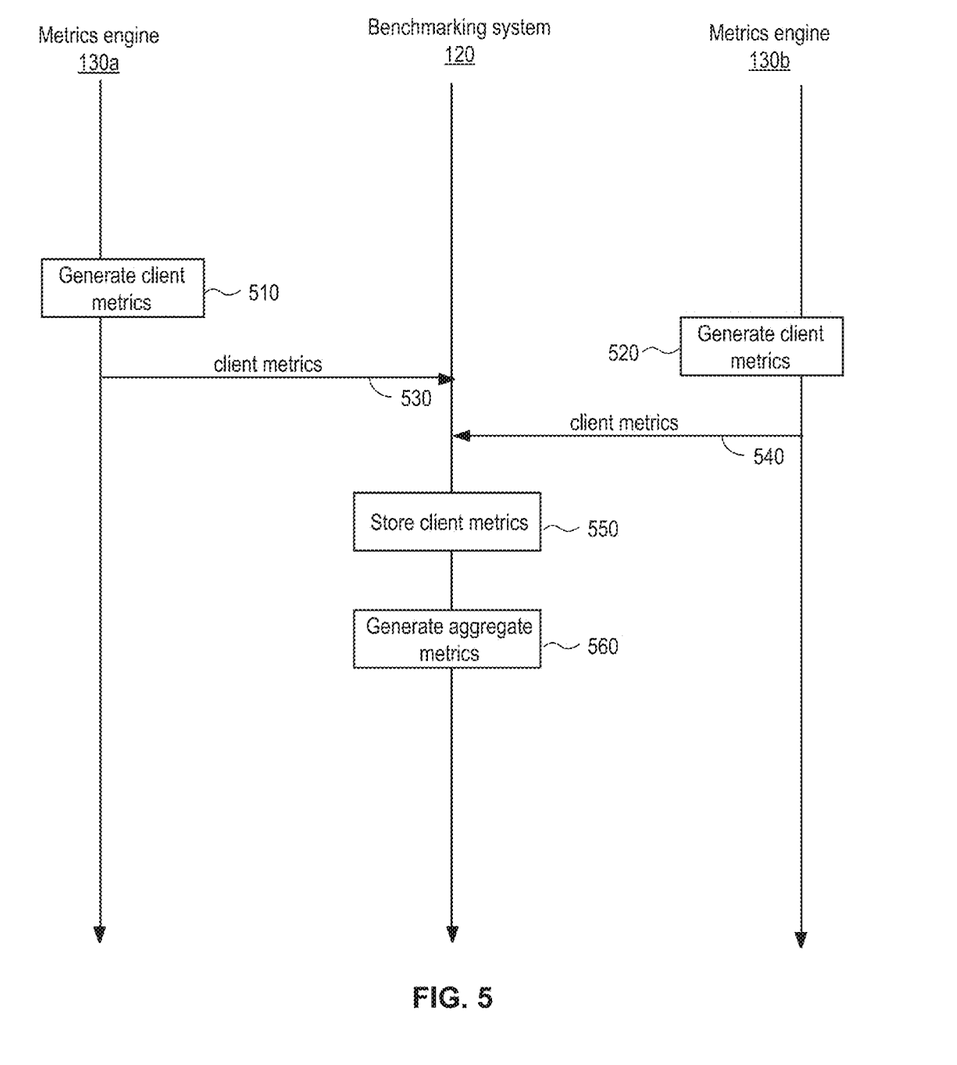
FIG. 5 is a sequence diagram illustrating steps involved in aggregating multiple organizations' security data according to one embodiment.

FIG. 5 is a sequence diagram illustrating steps involved in aggregating multiple organizations' security data according to one embodiment. In step 510, a first metrics engine 130a generates client metrics. For example, metrics generation module 360a generates client metrics and stores them as client metrics 340a.

In step 520, a second metrics engine 130b generates client metrics. For example, metrics generation module 360b generates client metrics and stores them as client metrics 340b.

In step 530, the first metrics engine 130a sends client metrics to a benchmarking system 120. For example, reporting module 370a sends the contents of client metrics 340a to the benchmarking system 120.

In step 540, the second metrics engine 130b sends client metrics to the benchmarking system 120. For example, reporting module 370b sends the contents of client metrics 340b to the benchmarking system 120.

Note that steps 510 and 530 are executed asynchronously with respect to steps 520 and 540. In particular, step 520 can occur before step 510, simultaneously with step 510, or after step 510. Also, step 540 can occur before step 530, simultaneously with step 530, or after step 530.

In step 550, the benchmarking system 120 stores the received client metrics. For example, client metrics received from the first metrics engine 130a are stored in client metrics repository 430 in a first database instance, and client metrics received from the second metrics engine 130b are stored in client metrics repository 430 in a second database instance.

In step 560, the benchmarking system 120 generates aggregate metrics. For example, the aggregation module 470 generates aggregate metrics (based on the contents of the client metrics repository 430) and stores them in aggregate metrics repository 440.

Figure 6:
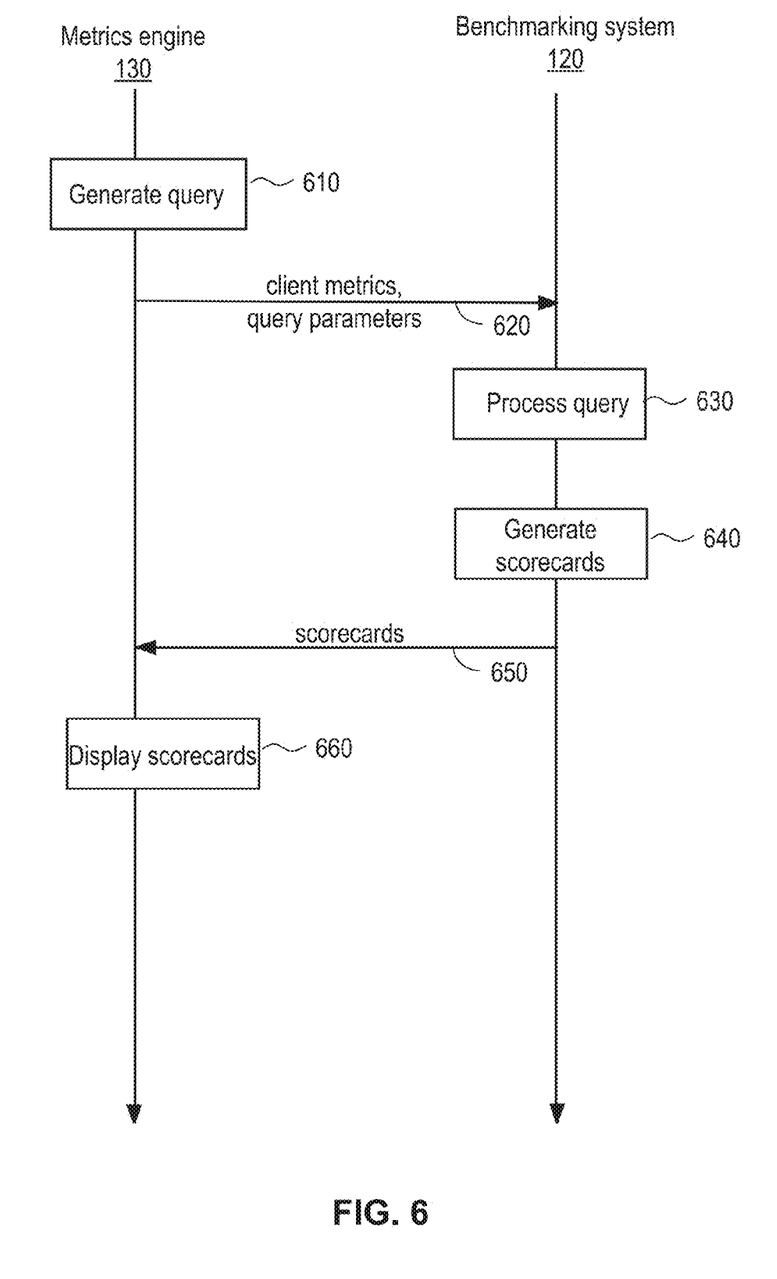
FIG. 6 is a sequence diagram illustrating steps involved in comparing one organization's security data to an aggregation of multiple organizations' security data according to one embodiment.

FIG. 6 is a sequence diagram illustrating steps involved in comparing one organization's security data to an aggregation of multiple organizations' security data according to one embodiment. In step 610, a metrics engine 130 generates a query. For example, user interface module 390 receives user input specifying one or more organizational attributes and, for each attribute, a value.

In step 620, the metrics engine 130 sends a query to a benchmarking system 120. For example, query module 380 sends the contents of client metrics 340 and various query parameters to the benchmarking system 120.

In step 630, the benchmarking system 120 processes the query. For example, query processing module 480 analyzes the query to determine the query parameters and then identifies the relevant aggregate metrics within aggregate metrics repository 440.

In step 640, the benchmarking system 120 generates scorecards. For example, visualization module 490 generates a client scorecard based on the contents of client metrics 340 (sent in step 620) and a community scorecard based on the relevant aggregate metrics (identified in step 630).

In step 650, the benchmarking system 120 sends the generated scorecards to the metrics engine 130.

In step 660, the metrics engine 130 displays the scorecards.

Figure 7:
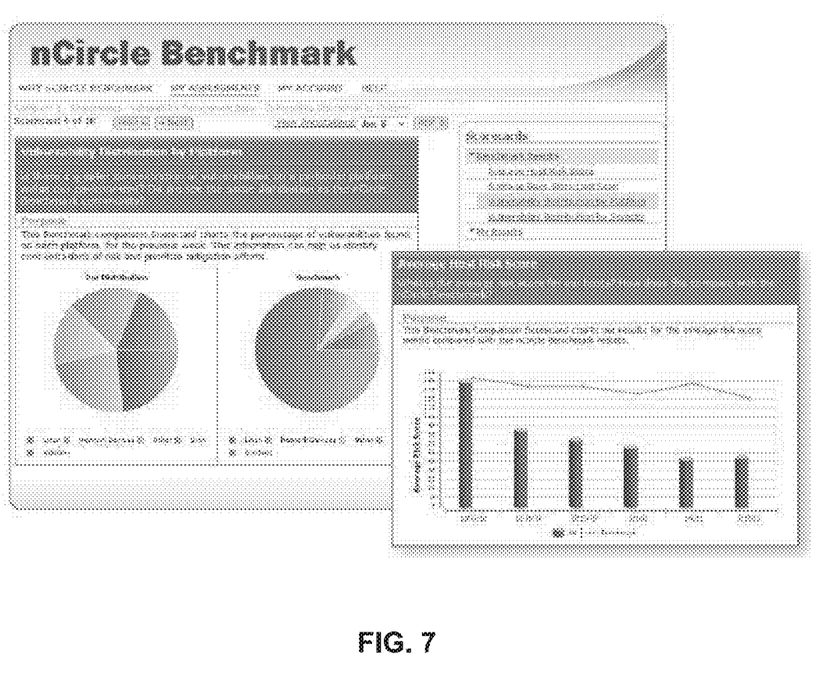
FIG. 7 is a graphical user interface illustrating a comparison of one organization's security data to an aggregation of multiple organizations' security data according to one embodiment.

FIG. 7 is a graphical user interface illustrating a comparison of one organization's security data to an aggregation of multiple organizations' security data according to one embodiment. FIG. 7 shows two overlapping windows. The larger window, which is partially obscured, shows two scorecards. Both scorecards concern vulnerability distribution by platform. The scorecard on the left is a client scorecard, showing metrics data from one organization. The scorecard on the right is a community scorecard, showing aggregate metrics data from multiple organizations. Both scorecards display metrics data in the form of a pie chart.

The smaller window, which is not obscured, shows one scorecard that shows both client metrics and aggregate metrics. Both metrics concern average host risk score. The client metrics are shown in the form of a bar graph, while the aggregate metrics are shown in the form of a line graph.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of comparing an organization's security data to an aggregation of multiple organizations' security data, the method comprising:
   receiving, at a single repository, security data separately from each of multiple organizations having a plurality of organizational characteristics, the security data received at each of multiple accounts corresponding to the multiple organizations;
   authenticating the security data to each of the multiple accounts;
   aggregating, at the single repository, the received security data based on the organizational characteristics to generate sets of aggregate data associated with the organizational characteristics of the multiple organizations, wherein the receiving and aggregating takes place without communicating at least a portion of the security data associated with at least one of the multiple organizations to at least another of the multiple organizations;

receiving a query from an organization of the multiple organizations, the query specifying a particular organizational characteristic of the plurality of organizational characteristics and a staleness parameter indicating a time period of desired data;

in response to the query, identifying a set from the sets of aggregate data, the identified set associated with the specified organizational characteristic and falling within the indicated time period of the staleness parameter;

generating a representation of the organization's security data in relation to the identified set from the sets of aggregate data, wherein the representation comprises at least a first indication of the security data for the organization and a second indication of cumulative security data for the remaining multiple organizations, the first indication being separate from the second indication; and transmitting the representation to the organization in response to the query.

2. The method of claim 1, further comprising storing the received security data in separate database instances, wherein security data from a first organization is stored in a separate database instance from security data from a second organization.

3. The method of claim 1, wherein an organizational characteristic describes demographic information regarding an organization, and wherein the demographic information comprises one or more elements selected from the group consisting of an industry within which the organization operates, a size of the organization, a number of assets under management by the organization, and a geographic region within which the organization operates.

4. The method of claim 1, wherein an organizational characteristic describes information regarding an organization, and wherein the information comprises one or more elements of a group containing compliance with a regulation, implementation of a best practice, membership in a consortium, and money spent on security.

5. The method of claim 1, wherein an organizational characteristic includes an attribute and one or more values for that attribute.

6. The method of claim 1, wherein the query further specifies an additional organizational characteristic, and wherein identifying the set of aggregate data associated with the specified organizational characteristic comprises identifying the set of aggregate data associated with the specified organizational characteristic and associated with the additional organizational characteristic.

7. The method of claim 1, wherein the query further specifies the organization's security data, and further comprising obtaining the organization's security data from the query.

8. The method of claim 1, further comprising obtaining the organization's security data from storage.

9. The method of claim 1, wherein the representation comprises a visual representation of security data that shows how a particular aspect of a security infrastructure is performing.

10. The method of claim 1, wherein the representation comprises a first visual component that describes the organization's security data and a second visual component that describes the identified set of aggregate data.

11. The method of claim 1, wherein the representation can be annotated by a first user, and wherein the first user's annotation can be viewed by a second user.

12. A non-transitory computer-readable storage medium storing executable computer program instructions for comparing an organization's security data to an aggregation of multiple organizations' security data, the instructions performing steps comprising:

receiving, at a single repository, security data separately from each of multiple organizations having organizational characteristics;

aggregating, at the single repository, the received security data based on the organizational characteristics to generate sets of aggregate data associated with the organizational characteristics of the multiple organizations, wherein the receiving and aggregating takes place without communicating at least a portion of the security data associated with at least one of the multiple organizations to at least another of the multiple organizations;

receiving a query from an organization of the multiple organizations, the query specifying a particular organizational characteristic of the organizational characteristics and a staleness parameter indicating a time period of desired data;

in response to the query, identifying a set from the sets of aggregate data, the identified set associated with the specified organizational characteristic and falling within the indicated time period of the staleness parameter;

generating a representation of the organization's security data in relation to the identified set from the sets of aggregate data, wherein the representation comprises at least a first indication of the security data for the organization and a second indication of cumulative security data for the remaining multiple organizations, the first indication being separate from the second indication; and transmitting the representation to the organization in response to the query.

13. The storage medium of claim 12, wherein an organizational characteristic describes demographic information regarding an organization, and wherein the demographic information comprises one or more elements selected from the group consisting of an industry within which the organization operates, a size of the organization, a number of assets under management by the organization, and a geographic region within which the organization operates.

14. The storage medium of claim 12, wherein the query further specifies a staleness preference that specifies how current the set of aggregate data associated with the specified organizational characteristic must be for the set of aggregate data to be used to answer the query.

15. The storage medium of claim 12, wherein the representation comprises a first visual component that describes the organization's security data and a second visual component that describes the identified set of aggregate data.

16. A computer system for comparing an organization's security data to an aggregation of multiple organizations' security data, the computer system comprising:

at least one non-transitory computer-readable storage medium storing executable computer program instructions comprising instructions for:

receiving, at a single repository, security data separately from each of multiple organizations having organizational characteristics;

aggregating, at the single repository, the received security data based on the organizational characteristics to generate sets of aggregate data associated with the organizational characteristics of the multiple organizations, wherein the receiving and aggregating takes place without communicating any of the security data from the multiple organizations to any other one of the multiple organizations;

receiving a query from an organization of the multiple organizations, the query specifying a particular organizational characteristic and a staleness parameter indicating a time period of desired data;

identifying a set from the sets of aggregate data, the identified set associated with the specified organizational characteristic and falling within the indicated time period of the staleness parameter;

generating a representation of the organization's security data in relation to the identified set from the sets of aggregate data, wherein the representation comprises first metrics data associated with the organization's security data, and second metrics data associated with security data from the identified set of aggregate data associated with the multiple organizations; and transmitting the representation to the organization in response to the query; and a processor for executing the computer program instructions.

17. The computer system of claim 16, wherein an organizational characteristic describes demographic information regarding an organization, and wherein the demographic information comprises one or more elements selected from the group consisting of an industry within which the organization operates, a size of the organization, a number of assets under management by the organization, and a geographic region within which the organization operates.

18. The computer system of claim 16, wherein the representation comprises a first visual component that describes the organization's security data and a second visual component that describes the identified set of aggregate data.

* * * * *